United States Patent [19]
Suzuki

[11] Patent Number: 6,016,229
[45] Date of Patent: Jan. 18, 2000

[54] WIDE-ANGLE LENS

[75] Inventor: Kenzaburo Suzuki, Yokohama, Japan

[73] Assignee: Nikon Corporation, Tokyo, Japan

[21] Appl. No.: 09/114,327

[22] Filed: Jul. 13, 1998

[30] Foreign Application Priority Data

Aug. 5, 1997 [JP] Japan .................................. 9-222072

[51] Int. Cl.[7] .............................. G02B 9/12; G02B 9/00
[52] U.S. Cl. ........................................ 359/784; 359/740
[58] Field of Search ................................. 359/680–682, 359/689, 784, 740, 749, 781–783, 761, 770

[56] References Cited

U.S. PATENT DOCUMENTS

| | | | |
|---|---|---|---|
| 3,862,794 | 1/1975 | Fujii | 350/214 |
| 3,981,563 | 9/1976 | Nakamura | 350/214 |
| 4,009,944 | 3/1977 | Takahashi | 350/214 |
| 4,210,388 | 7/1980 | Ikeda | 350/214 |
| 5,557,473 | 9/1996 | Sugiyama | 359/757 |

Primary Examiner—Georgia Epps
Assistant Examiner—David N. Spector
Attorney, Agent, or Firm—Chapman and Cutler

[57] ABSTRACT

A wide-angle lens and a superwide-angle lens suitable to electronic imaging cameras (e.g., video cameras and digital still cameras) is provided. In particular, a wide-angle lens having a long back focus and with an angle of view of about 75 degrees is provided.

This wide-angle lens comprises a first lens group G1 having a negative refractive power, a second lens group G2 having a positive refractive power, a diaphragm, and a third lens group G3 having a positive refractive power in this order from the object. The first lens group G1 has a positive meniscus lens and at least one negative meniscus lens. The third lens group G3 includes a cemented lens having a convex surface facing the object side, said convex surface being positioned closest to the object in this lens group. This wide-angle lens satisfies the conditions

$0.5 < |f1/f| < 1.05$

$1.7 < bf/f < 4.0$ where f1 is the focal length of the first lens group G1, f is the focal length of the wide-angle lens, and bf is the back focus.

20 Claims, 4 Drawing Sheets

FIG. 3

WIDE-ANGLE LENS

BACKGROUND OF THE INVENTION

1. Field of the Invention

This invention relates to a wide-angle lens for electronic imaging using a solid-state image sensor, such as a CCD, and to a superwide-angle lens which has a long back focus with an angle of view of about 75 degrees.

2. Description of Related Invention

Conventionally, wide-angle lenses are used mainly in silver halide photographing optical systems. One example of such wide-angle lenses is disclosed in Japanese Patent Publication (After Examination) No. 57-54767. However, in recent years, wide-angle lenses have been used in electronic photographing cameras, such as electronic still cameras and ITV cameras, the latter being in great demand as monitor cameras. A wide-angle lens used in a ITV camera is disclosed in, for example, Japanese Patent Publication (After Examination) Nos. H1-53765 and H8-20593.

Since an ITV camera is often used as a monitor camera, the lens used in such an ITV camera is required to have a wide angle of view. In addition, because filters are inserted in the lens system of the ITV camera for the purpose of protecting the camera tube, the back focus must be sufficiently long. Similarly, when a wide-angle lens is applied to an electronic still camera, a sufficiently long back focus is also required because an optical low-pass filter and a color separation prism are inserted in the lens system. Furthermore, in order to avoid shading, an adequate quantity of ambient light must be taken in and, accordingly, the exit pupil must be positioned sufficiently far.

However, all of the wide-angle lenses disclosed in the publications mentioned above have one or more problems, for example, insufficient back focus, insufficient compensation for the lens aberrations, or insufficient distance to the exit pupil. For these reasons, the conventional wide-angle lenses are not suitable to a high-performance electronic imaging wide-angle lens or a superwide-angle lens.

SUMMARY OF THE INVENTION

Therefore, it is an object of the invention to overcome the problems in the prior art and provide a wide-angle lens and a superwide-angle lens suitable to electronic imaging camera, such as video cameras and digital still cameras. It is also an object of the invention to provide a wide-angle lens which especially has an angle of view of about 75 degrees and a long back focus.

In order to achieve the objects, the wide-angle lens according to an embodiment of the invention comprises a first lens group G1 having a negative refractive power, a second lens group G2 having a positive refractive power, a diaphragm, and a third lens group G3 having a positive refractive power in this order from the object side, and satisfies the conditions $$0.5<|f1/f|<1.05 \quad (1)$$

$$1.7<bf/f<4.0 \quad (2)$$

where f1 is the focal length of the first lens group G1, f is the focal length of the wide-angle lens, and bf is the back focus.

The first lens group G1 includes a positive meniscus lens and at least one negative meniscus lens in this order from the object side. The third lens group G3 includes a cemented lens having a convex surface facing the object side. This convex surface is positioned closest to the object in this lens group.

Thus, the wide-angle lens according to the invention is of a retrofocus type, which can achieve a sufficiently long back focus relative to the focal length of the entire wide-angle lens system.

If a color separation element, such as a color separation prism or a dichroic mirror, is included in the optical system, the angle of the light flux reaching the top half of the image plane with respect to the color separation element (e.g., the dichroic mirror) becomes equal to the angle of the light flux reaching the bottom half of the image plane with respect to the color separation element. To this end, the lens system must be made substantially telecentric on the image side in order to avoid unevenness of colors between the upper and lower halves of the resultant image. In general, a substantially telecentric optical system can be achieved by placing a diaphragm near the object side principal point of the lens group positioned on the image side of the diaphragm. In the present invention, a diaphragm is positioned between the second lens group G2 and the third lens group G3 and, accordingly, a substantially telecentric optical system is achieved. It is more preferable to place the diaphragm slightly closer to the second lens group G2 than the center point between the second and third lens groups G2 and G3 from the viewpoint of correction of the aberrations, while still keeping a good telecentricity.

The inequality (1) defines the appropriate range of the focal length of the first lens group G1 relative to the focal length of the entire wide-angle lens system. As has been mentioned earlier, the wide-angle lens of the present invention is based on the retrofocus configuration. In a retrofocus type lens, the refractive power distribution of the lens group that is positioned on the object side and has a negative refractive power (i.e., the first lens group G1 in the present invention) is important to the lens arrangement of the entire system. In fact, the refractive power distribution of the first lens group G1 greatly affects the length of the back focus and the amount of off-axis aberrations, which further influences the final lens structure and the lens performance.

In the wide-angle lens according to the invention, the appropriate range of the focal length of the first lens group G1 is defined first. Above the upper limit of the inequality (1), the Petzval sum is likely to become negative, and the field curvature becomes excessive in the positive side, which is inappropriate for the lens system. Distortion also becomes large in the positive side, and a satisfactory image quality can not be obtained. In addition, a sufficient back focus can not be achieved above this range. On the other hand, below the lower limit of the inequality (1), the Petzval sum is likely to become positive, and the field curvature becomes excessive in the negative side, which is again inappropriate. Distortion also becomes large in the negative side, and a satisfactory image quality can not be obtained. In addition, the total length of the lens system is apt to increase, which makes it difficult to design a compact wide-angle lens. It is the most preferable to set the upper limit of inequality (1) to 1.0 and to set the lower limit to 0.7.

Inequality (2) defines the appropriate range of the back focus relative to the focal length of the entire system of the wide-angle lens. Above the upper limit of inequality (2), the back focus becomes too long, which causes the lens system to become large. In addition, the diameter of the rear lens becomes too large, resulting in a increased size of entire lens system. Distortion is apt to increase in the negative side, and image quality is deteriorated. On the other hand, below the lower limit of inequality (2), the back focus becomes too small, and a sufficient space for accommodating a filter or a prism can not be obtained. Also, the exit pupil approaches the image plane, which is likely to cause shading. It is the most preferable to set the upper limit of inequality (2) to 2.5 and to set the lower limit to 1.8.

The wide-angle lens further satisfies the conditions $$0.5 < d/f < 2.0 \quad (3)$$

$$-0.1 < f/f12 < 0.15 \quad (4)$$

where d is the distance between the two lenses positioned immediately before and after the diaphragm, and f12 is the composite focal length of the first lens group G1 and the second lens group G2.

Inequality (3) defines the appropriate range of the gap between the two lens surfaces immediately before and after the diaphragm relative to the focal length of the entire system of the wide-angle lens. As has been mentioned earlier, the diaphragm is preferably positioned between the second lens group G2 and the third lens group G3. The distance between the second and third lens groups G2 and G3 is important to the lens system. By satisfying the inequality (3), the distance between these two lens groups (G2 and G3) is set to the appropriate range, and a satisfactory telecentricity can be achieved. Above the upper limit of inequality (3), the diameters of both the front and rear lenses become too large, and the size of the entire lens system increases. In addition, higher-order coma and astigmatism are likely to arise. Conversely, below the lower limit of inequality (3), aberration compensation in the entire lens system becomes unsatisfactory and, in addition, the position of the exit pupil becomes too close.

Inequality (4) defines the appropriate range of the composite focal length of the first lens group G1 and the second lens group G2 relative to the focal length of the entire system of the wide-angle lens. It is preferable for the space between the second and third lens groups G2 and G3 to be afocal when focusing on both infinity and a close-distance because it can achieve a wider angle of view and a sufficient back focus. In other words, it is generally preferable that the absolute value of the composite focal length of the first and second lens groups G1 and G2 is set to an appropriately large value. If the composite focal length is insufficient (that is, above the upper limit of inequality (4)), the light beam must be converged at the third lens group G3 to a great extent, although a sufficient back focus is obtained, which makes it difficult to correct various aberrations including the spherical aberration. On the other hand, if the composite focal length becomes too large (that is, below the lower limit of inequality (4)), a sufficient back focus can not be achieved. In addition, aberrations in the entire lens system can not be satisfactorily corrected, and especially, it becomes difficult to correct the coma in the lower half of the lens system.

Preferably, the wide-angle lens further satisfies the condition $$0.6 < f23/f < 5.0 \quad (5)$$

where f23 is the composite focal length of the second lens group G2 and the third lens group G3.

Inequality (5) defines the appropriate range of the composite focal length of the second and third lens groups G2 and G3 relative to the focal length of the entire wide-angle lens. The importance of the refractive power distribution of the first lens group G1 has already been explained in connection with inequality (1). Inequality (5) exhibits the importance of the refractive power distribution in the positive lens groups positioned on the image side. Because the magnitude of the back focus and the amount of aberrations greatly vary depending on the refractive power distribution, and because it further affects the geometric structure and the performance of the end product (i.e., wide-angle lens), the refractive power distribution in the positive lens groups must be appropriately selected.

Above the upper limit of inequality (5), an adequate back focus is easily achieved. However, the height of the light beam from the optical axis becomes too high at the second and third lens groups G2 and G3, and it becomes difficult to correct coma. In addition, the Petzval sum is likely shift to the negative value and, as a result, the field curvature becomes too large on the positive side. Conversely, below the lower limit of inequality (5), it becomes difficult to achieve a sufficient amount of back focus. Furthermore, various aberrations arise at random in the entire lens system and, especially, it becomes difficult to correct the spherical aberration and the distortion.

The wide-angle lens further satisfies the conditions $$0.05 < d12/d23 < 0.8 \quad (6)$$

$$0.5 < f3/(Fno*f) < 1.0 \quad (7)$$

where d12 is the on-axis length of the air gap between the first lens group G1 and the second lens group G2, d23 is the on-axis length of the air gap between the second lens group G2 and the third lens group G3, f3 is the focal length of the third lens group G3, and Fno is the F number of the entire optical system.

Inequality (6) defines the appropriate positions of the respective lens groups. Above the upper limit of inequality (6), both the front-lens diameter and the rear-lens diameter become too large, and higher order coma and astigmatism are likely to arise. Conversely, below the lower limit of inequality (6), not only aberration compensation in the entire lens system becomes unsatisfactory, but also the position of the exit pupil becomes too close. It is more preferable to set the upper limit of inequality (6) to 0.25 and to set the lower limit to 0.1.

Inequality (7) defines the appropriate range of the focal length of the third lens group G3 relative to the product of the focal length of the entire wide-angle lens and the F number of the optical system. Above the upper limit of inequality (7), an adequate back focus is easily achieved. However, the convergence of the light flux at the third lens group G3 becomes insufficient, which makes it difficult to satisfactorily correct coma and other aberrations. In addition, the Petzval sum shifts to a negative, which causes the field curvature to be excessive in the positive range. Furthermore, the F number of the entire optical system is likely to increase, and the illuminance on the image plane becomes insufficient. Below the lower limit of inequality (7), it becomes difficult to achieve a sufficient amount of back focus. In addition, aberrations arise at random in the entire system and, especially, it becomes difficult to correct the spherical aberration and the distortion. Especially, with a large F number, the entire optical system becomes too bright, and the aperture aberration becomes too large. This causes flare to be generated.

It is preferable that the lens positioned closest to the object in the first lens group G1 is a convex meniscus lens with its convex surface facing the object side in order to satisfactorily correct the distortion. The first lens group G1 also has a concave lens on the image side of said convex meniscus lens. This concave lens is a meniscus lens with its convex surface facing the object side. If the angle of view is not so large, the concave meniscus lens may consist of a single lens. It is also preferable that the second lens group G2 consists of a convex lens having a large thickness.

Preferably, the radius of curvature of the image-side surface of this convex lens is set smaller than that of the object-side surface in order to satisfactorily correct the aberrations. The thickness of this convex lens is preferably greater than the focal length of the entire lens system.

The third lens group G3 may consist of three lenses, preferably, a concave lens and two convex lenses. The two lenses positioned on the object side in this group may comprise a cemented lens having a convex surface on the object side. This arrangement allows various aberrations, including the upper coma, to be satisfactorily corrected. In addition, ghost and flare caused by reflection between the lens surface and the image pick-up plane, such as a CCD, can be reduced. To be more precise, the third lens group G3 consists of a cemented lens having a positive refractive power, and a bi-convex lens positioned on the image side of the cemented lens. The cemented lens preferably consists of a concave lens having a strongly divergent concave surface on the image side, and a bi-convex lens. Concerning the bi-convex lens positioned closest to the image side, the radius of curvature of the image-side lens surface is preferably set smaller than that of the object-side lens surface in order to reduce ghost and flare due to reflection between the lens surface and the image pick-up plane (e.g., the CCD).

In conclusion, the wide-angle lens according to the invention comprises a first lens group G1, a second lens group G2, a diaphragm, and a third lens group G3 in this order from the object side. The first lens group G1 consists of a positive meniscus lens with its convex surface facing the object side, and two concave meniscus lenses, both having convex surfaces facing the object side. The second lens group G2 consists of a plano-convex lens or a bi-convex lens whose image-side lens surface is strongly convex with a large radius of curvature. The third lens group G3 having a positive refractive power, consists of a cemented lens and a bi-convex lens. The cemented lens consists of a concave lens having a strongly concave surface on the image side and a bi-convex lens.

In order to satisfactorily correct various aberrations and to improve the image quality, the refractive power distribution of the first and second lens groups G1 G2 is appropriately selected so that the wide-angle lens satisfies the condition $$-0.3 < f1/f2 < -1.0 \qquad (8)$$

where f1 is the focal length of the first lens group G1, and f2 is the focal length of the second lens group G2.

The refractive power of the second lens group G2 with respect to the entire lens system is also appropriately selected so that the wide-angle lens satisfies the condition $$1.0 < f2/f < 2.5 \qquad (9)$$

If f2/f exceeds the upper limit of inequality (9), it becomes difficult to correct the spherical aberration and the coma in the light beam positioned below the principal ray. Conversely, if f2/f is below the lower limit of inequality (9), the Petzval sum is excessive in the positive side, and the astigmatism can not be satisfactorily corrected.

The wide-angle lens of the present invention can be designed as an anti-vibration optical system by displacing a part of or the entirety of the third lens group G3 in the direction perpendicular to the optical axis. In this case, the anti-vibration lens group preferably consists of at least one convex lens and a concave lens.

Of course, an aspheric lens, a lens having a refractive index profile, or a diffraction optical element may be effectively used in this lens system in order to improve the image quality. Especially if an aspheric lens is used in the first lens group G1, the distortion can be greatly reduced. If an aspheric lens is inserted in the third lens group G3, the coma arising from the light component above the principal ray can be effectively corrected.

When focusing on a short-ranged object, it is the easiest way to move the entire lens system forward (toward the object) from the viewpoint of the lens mechanism. However, it is preferable to use a rear-focusing method, in which the first and second lens groups G1 and G2 are fixed, while the third lens group G3 is moved toward the object, because a rear-focusing method can achieve better image quality in short-range photographing. In addition, because the weight of the focusing lens group is relatively light in the rear-focusing type lens, it is suitable to autofocusing. Only the object-side lens in the third lens group G3 may be moved toward the object, while fixing the image-side lens in this lens group. In this case, the light beam is preferably parallel between the second and third lens groups G2 and G3.

The wide-angle lens of the present invention may also use a floating method, in which both the second and third lens groups G2 and G3 are moved forward, while changing the distance between them. This method can allow the lens system to focus on a short-range object, while maintaining a good image quality for the peripheral image. Again, in this case, it is preferable for the light beam to be parallel between the second and third lens groups G2 and G3.

In general, as the imaging magnification increases, the depth of field decreases. For this reason, the image is likely to be out of focus. However, this can be overcome by combining the zoom system with the autofocus system.

BRIEF DESCRIPTION OF THE DRAWINGS

The above and other objects, features, and advantages of the invention will be apparent from the detailed description which follows by way of exemplary embodiments of the invention with reference to the attached drawings, which are here described.

DETAILED DESCRIPTION OF THE PREFERRED EMBODIMENTS

The preferred embodiments of the invention will now be described in detail with reference to the attached drawings.

First Embodiment

Figure 1:
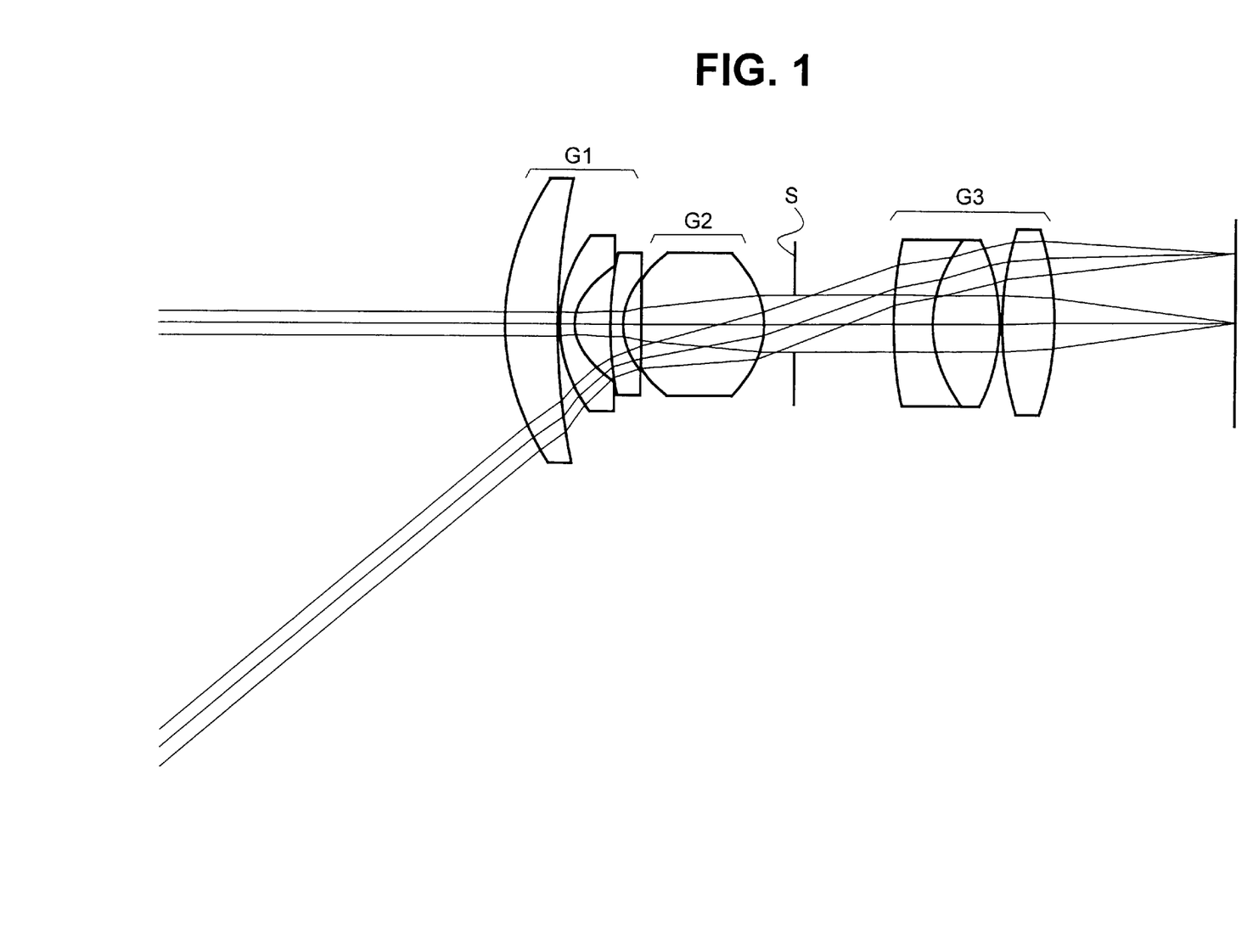
FIG. 1 illustrates the lens arrangement of the wide-angle lens according to a first embodiment of the invention.
Figure 2A:
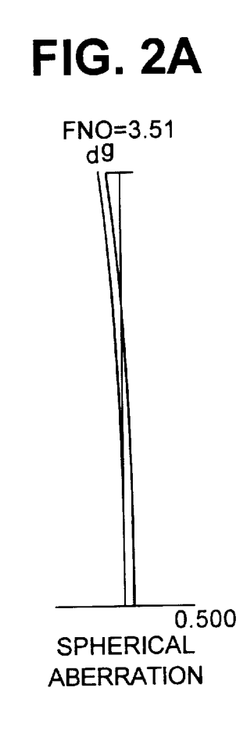
FIG. 2 shows various aberrations of the wide-angle lens of the first embodiment focusing on the infinity.
Figure 2B:
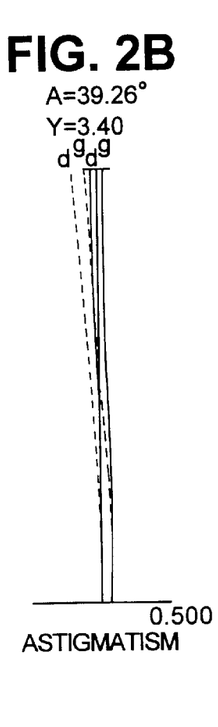
Figure 2C:
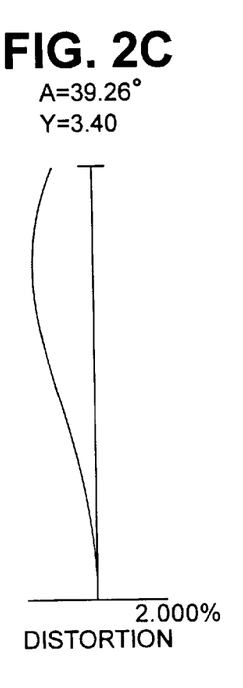
Figure 2D:
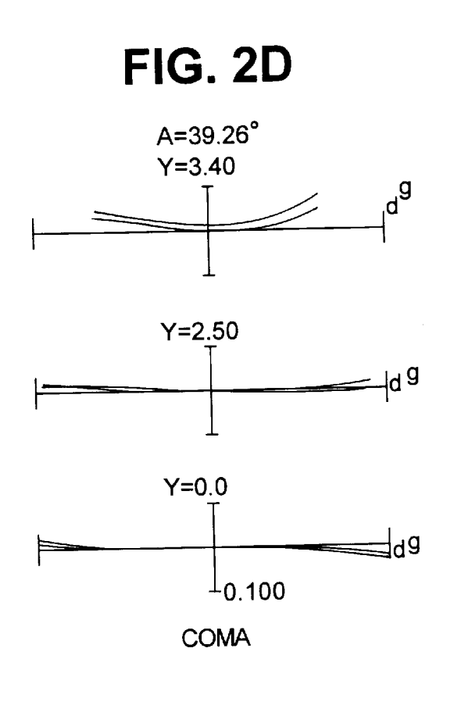
Figure 2E:
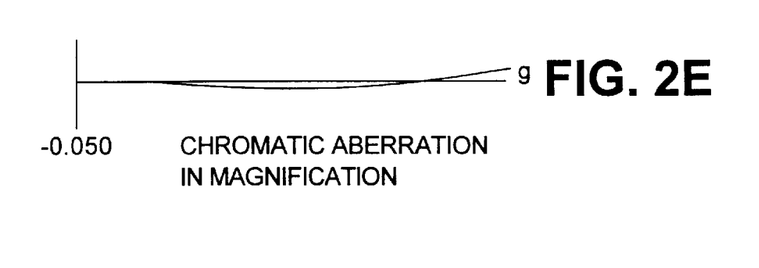

FIG. 1 illustrates the wide-angle lens according to the first embodiment of the invention. This wide-angle lens comprises a first lens group G1 having a negative refractive power, a second lens group G2 having a positive refractive power, a diaphragm, and a third lens group G3 having a positive refractive power in this order from the object. The first lens group G1 consists of a positive meniscus lens with its convex surface facing the object, and two negative meniscus lenses, each having a convex surface facing the object side. The second lens group G2 consists of a thick convex lens. The diaphragm is positioned closer to the second lens group G2 than the center between the second and third lens group G2 and G3. The third lens group G3 consists of a concave lens and two convex lenses.

The lens parameters and other parameters defined in inequalities are listed in Table 1. In Table 1, the surface number denotes a lens surface serially numbered from the object side, r denotes the radius of curvature of each lens surface, d denotes the distance between two adjacent lens surfaces, n(d) denotes the index of refraction with respect to d-line ($\lambda$=587.56 nm), n(g) denotes the index of refraction with respect to g-line ($\lambda$=435.84 nm), and v denotes the Abbe constant.

TABLE 1

| surface No. | r | d | n(d) | n(g) | v |
|---|---|---|---|---|---|
| 1 | 11.9000 | 2.5000 | 1.58144 | 1.59962 | 40.89 |
| 2 | 30.0000 | 0.1000 | 1.0 | | |
| 3 | 6.8500 | 0.8000 | 1.77250 | 1.79192 | 49.61 |
| 4 | 2.9014 | 1.6600 | 1.0 | | |
| 5 | 16.2500 | 0.7000 | 1.77250 | 1.79192 | 49.61 |
| 6 | 3.8060 | 0.8700 | 1.0 | | |
| 7 | ∞ | 5.9000 | 1.51680 | 1.52667 | 64.20 |
| 8 | −4.5730 | 1.5000 | 1.0 | | |
| 9 | diaphragm ∞ | 4.8467 | 1.0 | | |
| 10 | 30.5000 | 1.8000 | 1.84666 | 1.89390 | 23.83 |
| 11 | 6.9000 | 3.2000 | 1.51680 | 1.52667 | 64.20 |
| 12 | −8.1000 | 0.1000 | 1.0 | | |
| 13 | 17.5800 | 2.4000 | 1.51680 | 1.52667 | 64.20 |
| 14 | −15.1400 | 8.4483 | 1.0 | | |

<Parameters in Inequalities>

| | |
|---|---|
| f1 | −3.915 |
| f | 4.202 |
| bf | 8.4483 |
| d | 6.347 |
| f12 | −780.145 |
| f23 | 10.285 |
| d12 | 0.87 |
| d23 | 6.347 |
| f3 | 9.451 |
| F no | 3.51 |
| f2 | 8.849 |
| (1) |bf1/f| | 2.011 |
| (2) bf/f | 2.011 |
| (3) d/f | 1.511 |
| (4) f/f12 | −0.0054 |
| (5) f23/f | 2.448 |
| (6) d12/d23 | 0.137 |
| (7) f3/(Fno * f) | 0.641 |
| (8) f1/f2 | −0.422 |
| (9) f2/f | 2.106 |

FIG. 2 shows various aberrations of the wide-angle lens of the first embodiment in the infinity focusing state. In the aberration diagrams, Fno denotes the F number, Y denotes the image height, A denotes the angle of view, d denotes d-line ($\lambda$=587.6 nm), and g denotes g-line ($\lambda$=435.8 nm). In the astigmatism, the solid line indicates the sagittal image surface, and the broken line indicates the meridional image surface. As is clear from these diagrams, the aberrations are satisfactorily corrected in this lens system.

Second Embodiment

Figure 3:
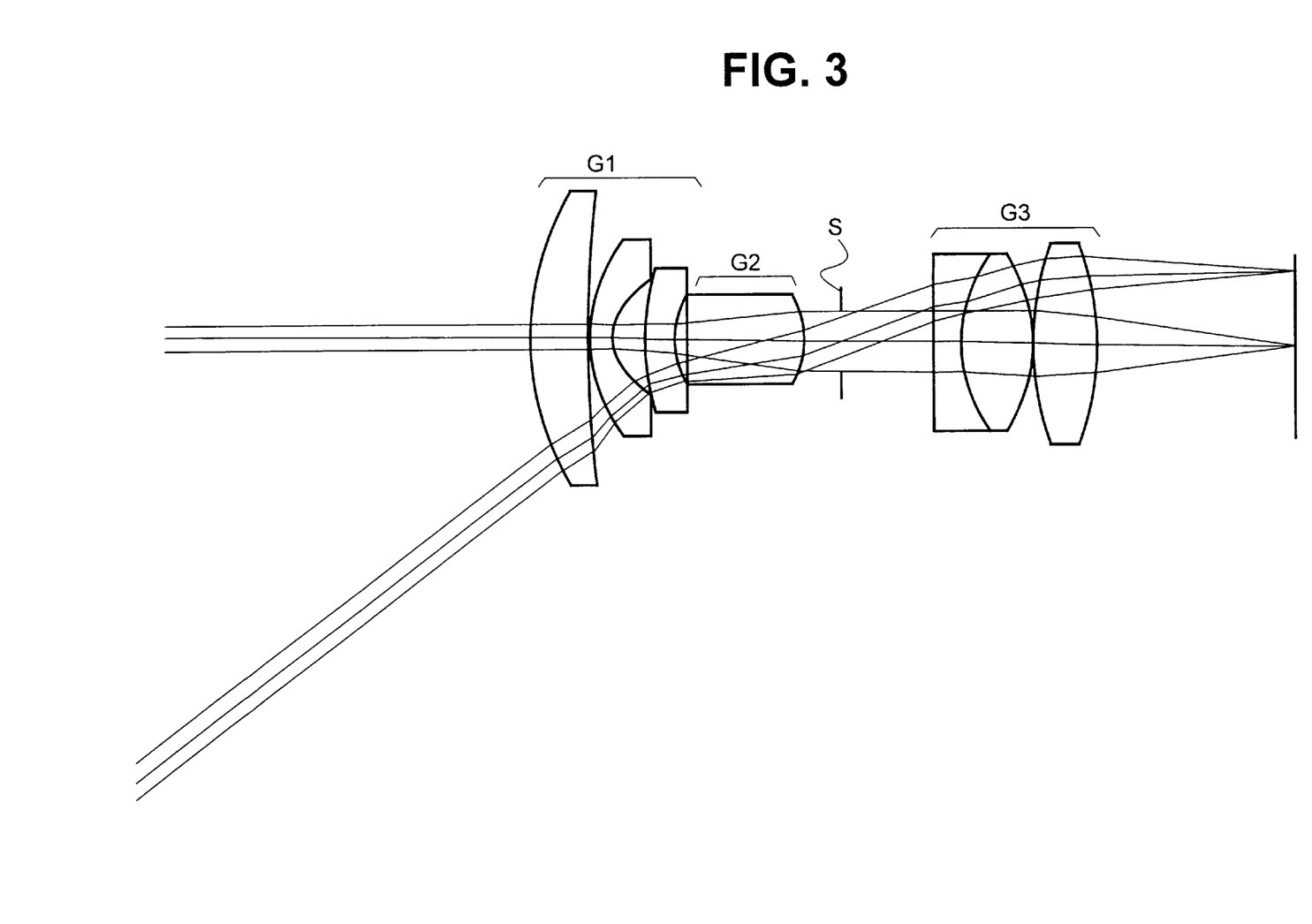
FIG. 3 illustrates the lens arrangement of the wide-angle lens according to a second embodiment of the invention.
Figure 4A:
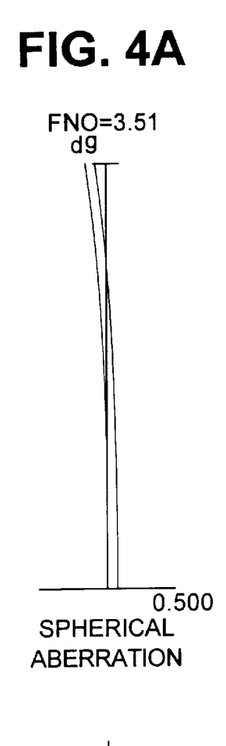
FIG. 4 shows various aberrations of the wide-angle lens of the second embodiment focusing on the infinity.
Figure 4B:
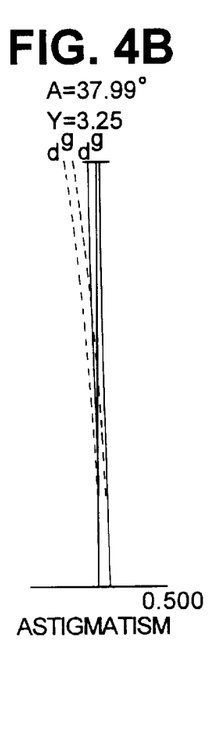
Figure 4C:
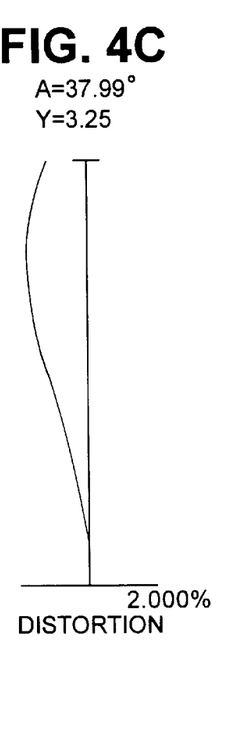
Figure 4D:
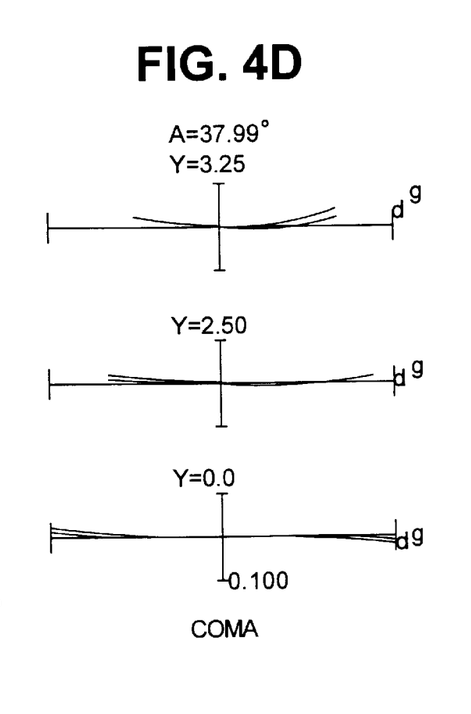
Figure 4E:
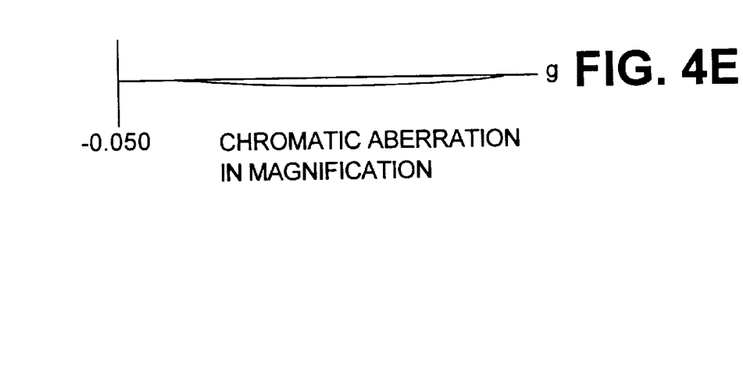

FIG. 3 illustrates the wide-angle lens according to the second embodiment of the invention. This wide-angle lens comprises a first lens group G1 having a negative refractive power, a second lens group G2 having a positive refractive power, a diaphragm, and a third lens group G3 having a positive refractive power in this order from the object. The first lens group G1 consists of a positive meniscus lens with its convex surface facing the object, and two negative meniscus lenses, each having a convex surface facing the object side. The second lens group G2 consists of a thick convex lens. The diaphragm is positioned closer to the second lens group G2 than the center between the second and third lens group G2 and G3. The third lens group G3 consists of a concave lens and two convex lenses.

The lens parameters and other parameters defined in inequalities are listed in Table 2. The symbols in the head line are the same as those in Table 1.

TABLE 2

| surface No. | r | d | n(d) | n(g) | v |
|---|---|---|---|---|---|
| 1 | 12.3245 | 2.5186 | 1.54814 | 1.56328 | 45.87 |
| 2 | 38.3897 | 0.1000 | 1.0 | | |
| 3 | 7.1482 | 1.0000 | 1.77279 | 1.79232 | 49.45 |
| 4 | 2.6536 | 1.3930 | 1.0 | | |
| 5 | 11.0226 | 1.2000 | 1.77279 | 1.79232 | 49.45 |
| 6 | 3.4012 | 0.6508 | 1.0 | | |
| 7 | 129.2026 | 4.9730 | 1.51680 | 1.52670 | 64.10 |
| 8 | −3.86354 | 1.5632 | 1.0 | | |
| 9 | diaphragm ∞ | 4.0605 | 1.0 | | |
| 10 | 167.1742 | 1.0756 | 1.80458 | 1.84631 | 25.50 |
| 11 | 6.5225 | 3.0151 | 1.51680 | 1.52670 | 64.10 |
| 12 | −7.7212 | 0.1000 | 1.0 | | |
| 13 | 14.2960 | 2.6401 | 1.51680 | 1.52670 | 64.10 |
| 14 | −12.3161 | 8.2000 | 1.0 | | |

<Parameters in Inequalities>

| | |
|---|---|
| f1 | −3.538 |
| f | 4.21 |
| bf | 8.2000 |
| d | 5.624 |
| f12 | 120.633 |
| f23 | 9.623 |
| d12 | 0.6508 |
| d23 | 5.624 |
| f3 | 8.988 |
| Fno | 3.51 |
| f2 | 7.352 |
| (1) |f1/f| | 0.84 |
| (2) bf/f | 1.948 |
| (3) d/f | 1.336 |
| (4) f/f12 | 0.035 |
| (5) f23/f | 2.286 |
| (6) d12/d23 | 0.116 |
| (7) f3/(Fno * f) | 0.608 |
| (8) f1/f2 | −0.481 |
| (9) f2/f | 1.746 |

FIG. 4 shows various aberrations of the wide-angle lens of the first embodiment in the infinity focusing state. The symbols used in the aberration diagrams are the same as those shown in FIG. 2. As is clear from these diagrams, the aberrations are satisfactorily corrected in this lens system.

The wide-lens according to the invention is suitable to high-performance electronic imaging cameras, such as video cameras and digital still cameras. A superwide-angle having an adequate back focus and with various aberrations satisfactorily corrected is also provided by the present invention.

What is claimed is:

1. A wide-angle lens system having an object side and an image side, comprising in this order from the object side:

a first lens group G1 having a negative refractive power, the first lens group G1 including a positive meniscus lens and at least one negative meniscus lens in this order from the object side;

a second lens group G2 having a positive refractive power;

a diaphragm; and a third lens group G3 having a positive refractive power, the third lens group G3 including a cemented lens having a convex surface facing the object side, said convex surface being positioned closest to the object in this lens group, the wide-angle lens system satisfying the conditions $$0.5<|f1/f|<1.05$$

$$1.7<bf/f<4.0$$

where f1 is a focal length of the first lens group G1, f is a focal length of the wide-angle lens, and bf is back focus.

2. The wide-angle lens system according to claim 1, further satisfying the conditions $$0.5<d/f<2.0$$

$$-0.1<f/f12<0.15$$

where d is a distance between the two lenses positioned immediately before and after the diaphragm, and f12 is a composite focal length of the first lens group G1 and the second lens group G2.

3. The wide-angle lens system according to claim 2, further satisfying the condition $$0.6<f23/f<5.0$$

where f23 is a composite focal length of the second lens group G2 and the third lens group G3.

4. The wide-angle lens system according to claim 3, wherein the second lens group G2 satisfies the condition $$0.05<d12/d23<0.8$$

where d12 is an on-axis length of an air gap between the first lens group G1 and the second lens group G2, and d23 is an on-axis length of an air gap between the second lens group G2 and the third lens group G3.

5. The wide-angle lens system according to claim 4, wherein the third lens group G3 further comprising a bi-convex lens positioned adjacent to the cemented lens on its image side, the cemented lens including a concave lens having a concave surface on the image side, and a bi-convex lens,
wherein the wide-angle lens system further satisfies the condition $$0.5<f3/(Fno*f)<1.0$$

where f3 is a focal length of the third lens group G3, and Fno is the F number of the entire optical system.

6. The wide-angle lens system according to claim 3, wherein the third lens group G3 further comprising a bi-convex lens positioned adjacent to the cemented lens on its image side, the cemented lens including a concave lens having a concave surface on the image side, and a bi-convex lens,
wherein the wide-angle lens system further satisfies the condition $$0.5<f3/(Fno*f)<1.0$$

where f3 is a focal length of the third lens group G3, and Fno is the F number of the entire optical system.

7. The wide-angle lens system according to claim 2, wherein the second lens group G2 satisfies the condition $$0.05<d12/d23<0.8$$

where d12 is an on-axis length of an air gap between the first lens group G1 and the second lens group G2, and d23 is an on-axis length of an air gap between the second lens group G2 and the third lens group G3.

8. The wide-angle lens system according to claim 2, wherein the third lens group G3 further comprising a bi-convex lens positioned adjacent to the cemented lens on its image side, the cemented lens including a concave lens having a concave surface on the image side, and a bi-convex lens,
wherein the wide-angle lens system further satisfies the condition $$0.5<f3/(Fno*f)<1.0$$

where f3 is a focal length of the third lens group G3, and Fno is the F number of the entire optical system.

9. The wide-angle lens system according to claim 1, further satisfying the condition $$0.6<f23/f<5.0$$

where f23 is a composite focal length of the second lens group G2 and the third lens group G3.

10. The wide-angle lens system according to claim 9, wherein the second lens group G2 satisfies the condition $$0.05<d12/d23<0.8$$

where d12 is an on-axis length of an air gap between the first lens group G1 and the second lens group G2, and d23 is an on-axis length of an air gap between the second lens group G2 and the third lens group G3.

11. The wide-angle lens system according to claim 9, wherein the third lens group G3 further comprising a bi-convex lens positioned adjacent to the cemented lens on its image side, the cemented lens including a concave lens having a concave surface on the image side, and a bi-convex lens,
wherein the wide-angle lens system further satisfies the condition $$0.5<f3/(Fno*f)<1.0$$

where f3 is a focal length of the third lens group G3, and Fno is the F number of the entire optical system.

12. The wide-angle lens system according to claim 1, wherein the second lens group G2 satisfies the condition $$0.05<d12/d23<0.8$$

where d12 is an on-axis length of an air gap between the first lens group G1 and the second lens group G2, and d23 is an on-axis length of an air gap between the second lens group G2 and the third lens group G3.

13. The wide-angle lens system according to claim 1, wherein the third lens group G3 further comprising a bi-convex lens positioned adjacent to the cemented lens on its image side, the cemented lens including a concave lens having a concave surface on the image side, and a bi-convex lens,
wherein the wide-angle lens system further satisfies the condition $$0.5<f3/(Fno*f)<1.0$$

where f3 is a focal length of the third lens group G3, and Fno is the F number of the entire optical system.

14. The wide-angle lens system according to claim 1, further satisfying the condition:

$$1.0<f2/f<2.5$$

where f2 is a focal length of the second lens group G2 and f is the focal length of the wide-angle lens system.

15. The wide-angle lens system according to claim 1, wherein the object-side surfaces of the positive meniscus lens and the negative meniscus lens in the first lens group G1 are convex surfaces.

16. The wide-angle lens system according to claim 1, wherein the second lens group G2 includes a convex lens with its image-side lens surface convex.

17. The wide-angle lens system according to claim 16, wherein the convex lens in the second group G2 having a thickness equal or greater than the focal length of the wide-angle lens system.

18. The wide-angle lens according to claim 17, further satisfying the condition:

$$1.0 < f2/f < 2.5$$

where f2 is a focal length of the second lens group G2 and f is the focal length of the wide-angle lens system.

19. The wide-angle lens system according to claim 3, further satisfying the condition:

$$1.0 < f2/f < 2.5$$

where f2 is a focal length of the second lens group G2 and f is the focal length of the wide-angle lens system.

20. The wide-angle lens system according to claim 5, wherein at least one lens of the third lens group G3 is positioned with ability to be displaced in the direction perpendicular to an optical axis of the lens group.

* * * * *